UNITED STATES PATENT OFFICE.

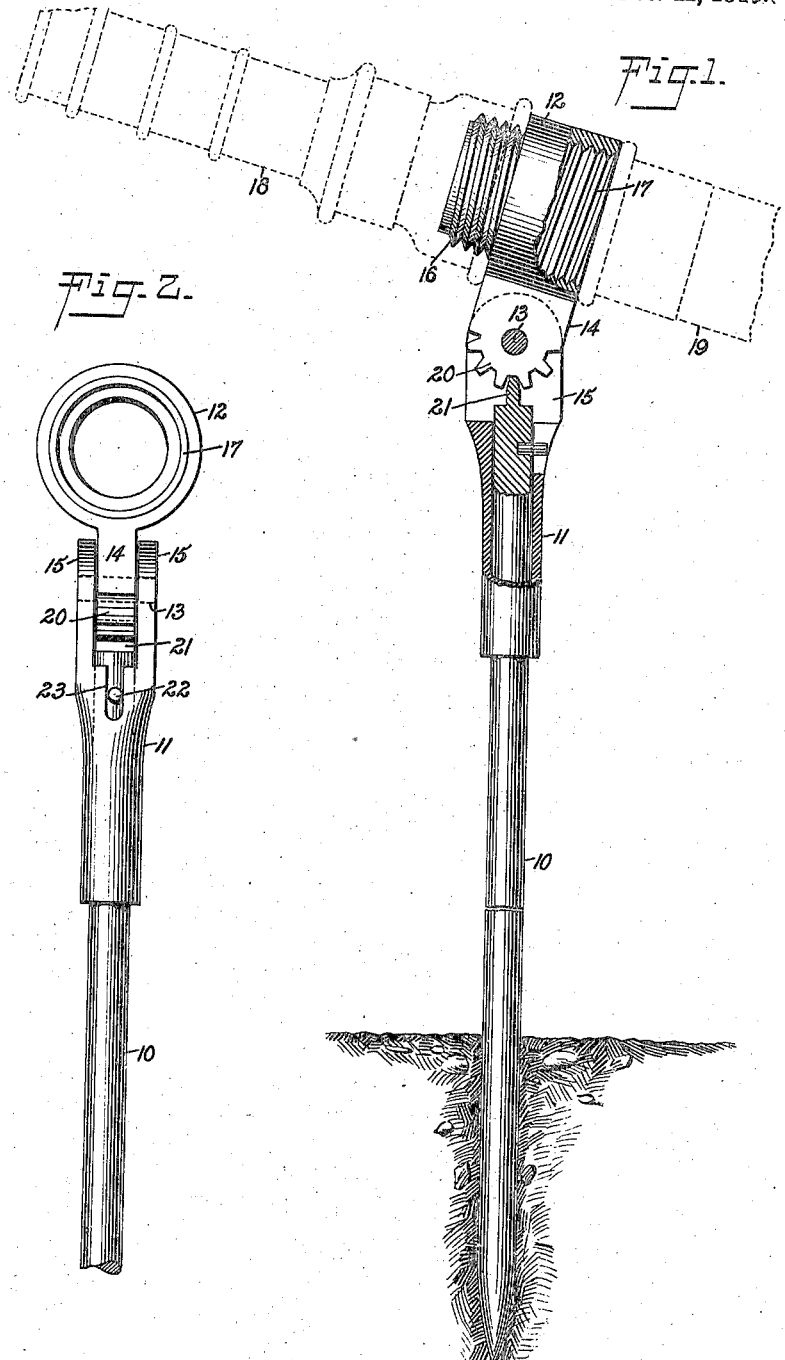

WINFIELD L. DINSMOOR, OF OAKLAND, CALIFORNIA.

GARDEN-HOSE ATTACHMENT.

1,249,918.  Specification of Letters Patent.  Patented Dec. 11, 1917.

Application filed April 18, 1917. Serial No. 162,834.

*To all whom it may concern:*

Be it known that I, WINFIELD L. DINSMOOR, a citizen of the United States, and a resident of Oakland, in the county of Alameda and State of California, have invented a new and Improved Garden-Hose Attachment, of which the following is a full, clear, and exact description.

My invention pertains to means for supporting a garden hose to optionally position the nozzle thereof at different locations in a garden or lawn and in various angular adjustments.

An object of the invention is to utilize the weight of the supported hose and nozzle to automatically lock the nozzle in a given angular adjustment, and maintain the locked engagement of the parts by the said weight.

In attaining the stated object, in the preferred form of my invention, I provide a supporting stake or standard adapted to be inserted in the ground, and I mount thereon for pivotal and vertically sliding movement, a fixture arranged to detachably connect respectively with a hose section and a nozzle, to couple the same, together with locking elements on the standard and fixture to be brought into engagement by a downward sliding movement of the fixture under the weight of the nozzle and hose section.

Other objects of my invention, and the advantages of the novel structural features characterizing the preferred form will more clearly appear as the description proceeds.

Reference is to be had to the accompanying drawings forming a part of this specification in which similar reference characters indicate corresponding parts in both views.

Figure 1 is a sectional side elevation of a device embodying my invention, showing the same in use;

Fig. 2 is an end view.

In carrying out my invention in accordance with the illustrated example, a standard 10 is provided, pointed at its lower end whereby to be readily inserted in the ground at a desired location. On the said standard at the upper end is slidably fitted a head designated generally by the numeral 11, and made for the most part in the form of a sleeve into which the standard telescopes. A transversely disposed fitting 12 is carried by the head 11 and pivoted thereto by a transverse pin 13 extending through an integral lug 14 on the under side, said lug being received between cheeks 15 on the upper end of the head 11. The fitting 12 is tubular presenting a throughbore, and at the ends thereof are external and internal threads 16, 17, to detachably receive respectively a nozzle 18 and a hose section 19. Thus the fitting 12 constitutes a coupling for the hose and nozzle and when the latter are connected, they may be moved through an arc with the pivot 13 as a center to dispose the nozzle at various angular positions.

The arrangement, it will be seen, results in the head 11 being subject to the weight of the supported hose and nozzle, whereby the complete fixture including the head 11 and the fitting or coupling 12 will tend to gravitate on the standard. To utilize the gravitational movement of the fixture on the standard, under the weight of the hose and nozzle, for maintaining the nozzle in a given angular adjustment, I form on the lug 14 a toothed sector 20, the curve of the sector being struck from the center of the pivot 13. The upper end of the standard 10 terminates in a dog 21 disposed vertically so that a sliding movement of the head 11 will serve to engage or disengage the said dog and the sector as will be readily understood. In order to prevent the head 11 from turning on the standard, a pin 22 projects laterally from the standard near the upper end and has movement in a vertical slot 23 formed in the head 11 in the sleeve thereof, at the base of the cheeks 15. Thus the head may freely slide while being held against turning.

It will be seen that in use the coupling 12 or the hose or nozzle adjacent to the coupling, may be grasped to raise the head 11 for disengaging the dog 20 and sector 21 and a quick movement will serve to dispose the nozzle at the desired angle so that upon merely releasing the grasp of the hose, etc., the weight thereof will automatically effect the locking engagement.

In referring to a nozzle it will be clearly understood that the nozzle may be of any suitable form to throw a stream, spray, or the like.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention I claim as new, and desire to secure by Letters Patent.

1. A garden hose attachment including a fitting having a bore formed at opposite ends with threads to receive, respectively, a hose section and a nozzle, to thus constitute a coupling, a head on which the said fitting is pivotally carried to assume different angular positions, a standard on which the said head is telescopically mounted, the standard being adapted to be inserted in the ground to optionally locate the nozzle, means to prevent turning of the head on the standard, a dog forming the upper terminal of the standard, and a toothed sector rigid on the said fitting and adapted to engage or disengage the said dog by a sliding of said head relatively to the standard, the curve of the sector being struck from the pivotal center of the fitting, and the said fitting and head being gravitationally movable on the standard under the weight of the hose and nozzle to automatically effect locking engagement between the sector and dog and maintain the nozzle at the desired angle.

2. A device of the class described including a supporting standard, a sleeve slidable on said standard and formed with spaced cheeks at the upper end and with a vertical slot, said standard having a pin extending into said slot to permit sliding of the sleeve while preventing turning thereof, an upwardly projecting dog rigid with the standard at the upper terminal thereof, a tubular fitting threaded at its opposite ends to receive, respectively, a hose and a nozzle, a lug integral with said fitting and received between the cheeks of the sleeve, a pivot pin extending through the cheeks and lug, and a toothed sector on the under side of said lug movable into or out of engagement with the said dog by a sliding movement of the sleeve on the standard.

WINFIELD L. DINSMOOR.